United States Patent [19] [11] 4,044,811
Dudek et al. [45] Aug. 30, 1977

[54] LAMINATED PNEUMATIC TIRE

[75] Inventors: Thomas J. Dudek, Tallmadge; Leon F. Marker, Cuyahoga Falls, both of Ohio; Hendrik Jan Jacob Janssen, Den Haag, Netherlands

[73] Assignee: The General Tire & Rubber Company, Akron, Ohio

[21] Appl. No.: 596,494

[22] Filed: July 16, 1975

[51] Int. Cl.² ............................................. B60C 5/12
[52] U.S. Cl. .............................. 152/354; 152/357 A; 156/110 CL
[58] Field of Search ................ 152/330 R, 354, 357, 152/357 A, 323, 349; 156/110 CL, 110 R, 118

[56] References Cited
U.S. PATENT DOCUMENTS

| 1,424,134 | 7/1922 | Litchfield | 152/323 |
| 2,902,072 | 9/1959 | Reuter | 152/357 A |
| 3,701,374 | 10/1972 | McGillvary | 152/330 R |
| 3,892,269 | 7/1975 | Powell et al. | 152/357 R X |

Primary Examiner—Robert B. Reeves
Assistant Examiner—Francis J. Bartuska

[57] ABSTRACT

A laminated pneumatic tire is disclosed which may be free of reinforcing fabric and which is made of a substantial number of alternating layers of high-modulus and low-modulus polymeric material such as synthetic rubber, polyurethane rubber, and various elastoplastic and high-modulus plastic materials including polycarbonate, nylon, epoxy resins, polystyrene and the like. The alternating hard and soft layers provide the tire with a necessary durability and resistance to flex cracking. The tire may contain low-modulus polymeric layers with a Young's modulus from 300 to 2000 or higher. The high-modulus layers of the tire may have a Young's modulus from 3000 to 50,000 or higher. The preferred process involved forming the individual layers from liquid polymeric materials, such as liquid polyurethane polymers, and forming the tire in molds wherein the layers are applied to the inside of the mold by spraying or otherwise applying the liquid polymer while rotating the mold or otherwise providing rotating motion between the applicator and the mold.

16 Claims, 6 Drawing Figures

LAMINATED PNEUMATIC TIRE

BACKGROUND OF THE INVENTION

1. Field of the Invention

The present invention relates to pneumatic tires having portions which are free of reinforcing fabric and more particularly to laminated pneumatic tires containing hard and soft layers arranged to provide a high resistance to flex cracking.

2. Description of the Prior Art

It has long been recognized in the pneumatic tire industry that fabric reinforced tires have many disadvantages and that it might be desirable to build a fabric-free tire which could be manufactured by less expensive procedures. Not only is the conventional method of tire fabrication slow and expensive, requiring separate handling and processing of one or more kinds of rubber and/or cord fabric for each tire, calendering and handling of individual plies, and final manual assembly of all of the components, but also, the conventional tire construction is not readily adapted to any kind of automation which would reduce the labor costs and improve the tire quality and uniformity. An additional cause of excessive manufacturing expense associated with conventional tire construction is the large amount of factory space taken up, first, by the many large curing presses required to cure green tires, one at a time, for anywhere from about 12 minutes to more than 20 minutes, and second, by the rubber processing and mixing equipment such as mills, Banburys, extruders, calenders, and tire building machines.

Other problems in conventional fabric-reinforced tires are the difficulty of uniform placement of the many components of the tire and the difficulty of obtaining uniform expansion from the cylindrical shape on a flat drum to the final toroidal shape. The laminated tire of the present invention eliminates some of these problems.

In its search for a tire configuration and construction method which does not require the lamination of cords and rubber compound and the subsequent manual buildup of ply layers, the tire industry has attempted to make at least the carcass portion of the tire by molding or casting a liquid polymer, such as a polyurethane, to the desired shape. The tire illustrated in U.S. Pat. No. 2,902,072 comprises a tread, inner and outer sidewalls, and a cellular polyurethane filling the space between the inner and outer sidewalls. U.S. Pat. No. 3,208,500 discloses the fabrication of the carcass portion of a pneumatic tire by molding a polyurethane or polyamide into a single, generally homogeneous layer. U.S. Pat. No. 3,274,322 discloses a method of flow-forming a material such as a polyurethane, using a doctor blade, to make a strip of material which can subsequently be formed into a tire carcass. U.S. Pat. No. 3,386,485 illustrates a method of making a "fabricless" pneumatic tire from any one of a number of suggested polymers and copolymers by separately molding the annular halves of a tire and subsequently molding the two halves together in a different press.

U.S. Pat. No. 3,396,773 illustrates the application of centrifugal casting techniques for making a tire which is described as being solid rather than pneumatic. The general concept of centrifugal casting has been applied to pneumatic tires as illustrated in U.S. Pat. No. 3,555,141 which discloses a method in which a heated mold, having its internal surface conforming to the external shape of a tire, is rotated while a liquid polyurethane is introduced therein. The rotation of the mold causes the polyurethane to flow and cover the entire inner surface of the mold and a stationary template, having the same shape as the inside of the tire, serves to spread the material in the same manner as a doctor blade. In U.S. Pat. No. 3,701,374 there is a disclosure of a fabric-free tire carcass made of a polyurethane elastomer, another elastomer, and methods of making the tire to produce the necessary physical properties.

To the extent pertinent, the above identified U.S. patents are herein incorporated by reference as background information and for supplementing the detailed description appearing below.

While many of the problems associated with conventional tire construction can be reduced or eliminated by fabrication of tires in accordance with the prior art patents discussed above, the cast tire configuration such as the type proposed in these patents has a number of serious problems, and use of such special tires has not been widespread. The major problem in the cast tire, in terms of tire life, is what is known as flex fatigue failure. Under the weight of the vehicle the portion of a tire in contact with the ground is deformed with the result that the rubber is continually flexed during operation of the tire. In conventional fabric reinforced tires, the fabric may for example withstand at least 85 percent of the inflation pressure and the rubber less than 15 percent. If the fabric is to be eliminated without changing the general shape of the tire, then it would be necessary to employ a rubber of higher-modulus to enable the tire to maintain its shape. However, the harder rubbers have a relatively short life due to flex fatigue failure. For example, whenever a small crack or defect occurs due to a microscopic flaw or a cut from a sharp object, there is a tendency for a crack to develop and grow during continual flexing until the tire fails or becomes dangerous. When using fabric reinforcement it is possible to employ softer rubbers which do not have the serious flex fatigue problem. However, when making a fabric-free tire using stiffer polymers, which are required to obtain the necessary strength, the flex fatigue problem is extremely serious. Experimental data with respect to fabric-free tires seems to indicate that sidewall flex cracking is the principle mode of failure.

SUMMARY OF THE INVENTION

An improved tire is obtained in accordance with the present invention by providing a novel laminated tire carcass construction employing a series of layers of a polymeric material having a relatively low tensile modulus and a plurality of layers of polymeric material having a relatively high tensile modulus, such as 5000 to 50,000 pounds per square inch. The layers are preferably arranged in an alternate pattern in such a manner as to provide the overall tire carcass with the desired strength and stiffness while at the same time providing a much greater resistance to flex fatigue failure than could be obtained from a homogeneous construction.

The tires of the present invention are preferably made from fluid polymeric materials which have a viscosity at processing temperatures such that they can flow and form the desired layers of the tire in a reasonable period of time. Rotational casting methods may be employed with the fluid polymers as well as other forming processes.

When using fluid polyurethane polymers a preferred method of forming the tire is to provide a mold with the desired annular shape of the tire, to apply to the interior surface of the mold a generally uniform layer of the polymeric material, thereafter to cure the layer or allow it to cure at least partially, and thereafter to apply a subsequent generally uniform layer with a different modulus. A large number of layers are applied and cured in this manner until the desired thickness is obtained. A doctor blade may be employed to shape the layers or to provide a uniform thickness, and relative rotation may be provided between the mold and the blade to achieve this. Where a liquid polymeric material is applied from a spray nozzle or other applicator, relative movement may be provided between the mold and the applicator during application of the liquid polymer, for example by rotating the mold relative to the applicator or vice versa. If desired the fluid materials may be so compounded and so treated that the necessary curing of one layer prior to application of the next layer takes place during only one or two revolutions of the mold.

The rotational casting method may be employed to form a large number of different layers of polyurethane polymers or other suitable polymers in various thicknesses from 0.001 to 0.1 inch. The hard and soft layers preferably alternate, but many different arrangements are possible which will provide the desired resistance to flex cracking.

When making a pneumatic tire by the above method from fluid polyurethane polymers, the tensile modulus and hardness of the different layers can be changed by changing the amount or type of curing agent used and the molecular weight or type of urethane polymer being used.

DESCRIPTION OF THE PREFERRED EMBODIMENT

Figure 1:
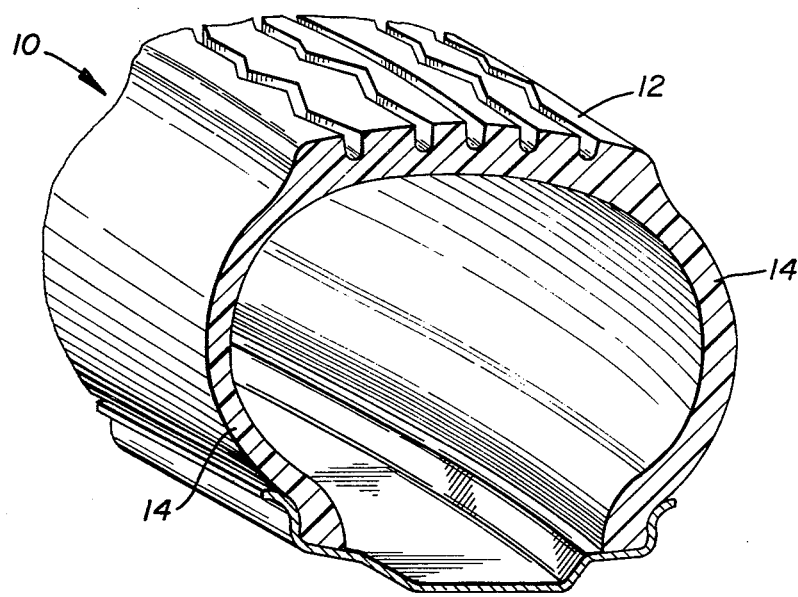
FIG. 1 is a fragmentary perspective view of a pneumatic tire of the type made in accordance with the present invention on a reduced scale.

Referring more particularly to the drawings, which are for the purpose of illustrating preferred embodiments of the invention and not for the purpose of limiting the same, FIG. 1 shows a pneumatic tire 10 comprising a tread portion 12 and two sidewall portions 14. It will be understood that FIG. 1 is partially schematic and that conventional circumferential reinforcing belts or other reinforcing means may be provided in the tread portion 12 without providing fabric reinforcement or other reinforcement in the sidewall portions 14. In other words the cross section of the tire may be generally as shown in U.S. Pat. No. 3,701,374 or in other patents mentioned previously. It will also be understood that, while the tire preferably has a toroidal cross section, the present invention also applies to tires of special cross section as illustrated for example in U.S. Pat. No. 3,840,060. Conventional means may be provided on the tire or on the wheel to reinforce the bead portion of the tire or to help hold it in place on the wheel rim.

Figure 2:
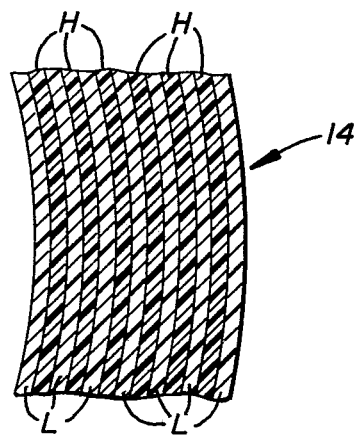
FIG. 2 is a fragmentary cross-sectional view of the laminated tire of FIG. 1 showing a portion of the sidewall of the tire.

The tire 10 of this invention is preferably made with a substantial number of layers of polymeric material, each layer preferably having a generally uniform thickness and completely covering the adjacent layer. In the embodiment of FIG. 2, the tire carcass and each of the sidewall portions 14 comprises a thirteen-layer laminate made up of alternating high-and low-modulus layers H and L. The low-modulus layer L is provided at both the inner and outer surfaces of the tire, and every other layer comprises a high-modulus layer H. This particular configuration makes it possible to obtain a tire of the desired strength and stiffness by use of high-modulus layers while at the same time minimizing the tendency for flex cracking. It will be understood that while 13-layers are often desirable, a different number of layers can also provide good results.

Figure 3:
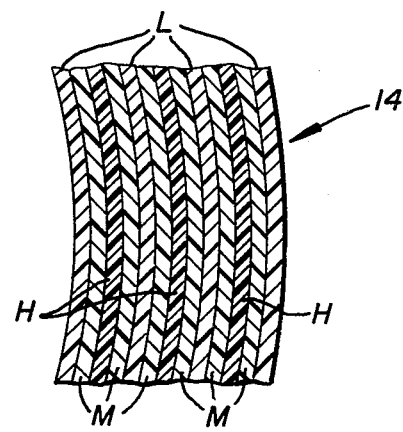
FIGS. 3, 4 and 5 are fragmentary views similar to FIG. 2 showing alternate embodiments of the laminated tire of this invention.

FIG. 3 illustrates a different embodiment, also with thirteen-layers, wherein a medium modulus layer M is provided in addition to the high-modulus layers H and the low-modulus layers L. This arrangement is similar to that of FIG. 2 in that the layers H and L alternate regularly with the low-modulus layer L at the inner and outer surface of the tire, but a medium modulus layer M is provided between each layer L and the nearest layer H. This makes it possible to employ layers H of extremely high-modulus without so abrupt a change in modulus when going from layer H to layer L. Where the tire has a very large number of layers such as 25 to 50 or more, it may be desirable to provide more than one layer of intermediate modulus between the low-modulus layer and the high-modulus layer.

Figure 4:
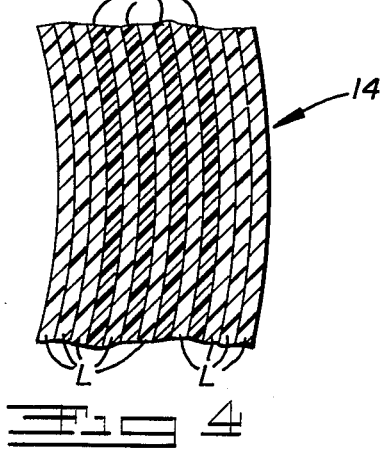

FIG. 4 illustrates another embodiment of the invention wherein the low- and high-modulus layers alternate like FIG. 2 in the central portion of the laminated structure and wherein several of the outer layers are formed of the same low-modulus material. In this Figure the first three layers on both the inside and outside of the carcass portion are the low-modulus layers L. One reason for using this type of construction is that the inner and outer surface portions of the tire are subjected to greater bending strains which are withstood better by the low-modulus material.

Figure 5:
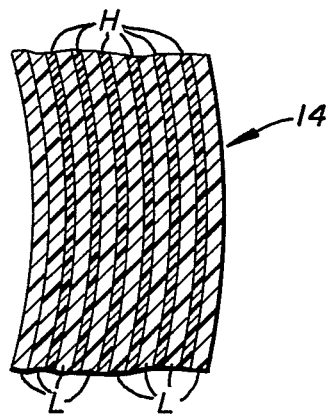

FIG. 5 shows another embodiment of the invention in which the various layers have different thicknesses. In the embodiments of FIGS. 2, 3 and 4 all of the layers are shown as having the same thickness, but it will be understood that some variation and thickness can be provided and that it is often desirable to provide low-modulus layers with a thickness somewhat greater than the high-modulus layers. In the embodiment of FIG. 5 the low- and high-modulus layers alternate regularly like FIG. 2 except that two low-modulus layers L are provided at the inner surface of the carcass.

Many different methods may be employed to build tires according to the present invention. The uncured tire can for example be built by forming a cylindrical laminate having ten or more layers and thereafter expanding the laminate from the cylindrical to the toroidal shape by a method somewhat similar to the conventional flat-band process. The tire may also be formed by applying the layers to the laminate while the laminate has a toroidal shape or other desired cross section as described hereinafter.

Some of the first tires made in accordance with the present invention were fabricated by manually applying to the outer surface of a metal mold a series of layers of liquid polymeric material having a fairly uniform thickness. Another possible method of building a tire is to apply successive layers of uncured sheet rubber or the like. However, manual methods are probably impractical due to the excessive cost of manufacture. In order to reduce cost it is preferable to employ a liquid polymeric material and automated procedures.

The polymeric materials which may be used to make tires according to the present invention are elastomers, elastoplastic materials or high-modulus plastics. The softer low-modulus layers of the tire are made from the elastomeric and/or elastoplastic materials and the harder high-modulus layers are preferably made from the elastoplastic materials or high-modulus plastics.

The elastomers are characterized by major glass transition temperatures below about minus 20° Centigrade, Young's moduli in the range of 100 to 6000 pounds per square inch, and the ability to sustain elongations of 100 percent or more without permanent deformation or rupture. The useful elastomers include polyurethane rubber, natural rubber, poly (butadiene) and various other synthetic rubbers including SBR rubbers.

The elastoplastic polymeric materials can have Young's moduli in the range of 3000 to 50,000 pounds per square inch. At room temperature these materials usually exhibit yield points below 50 percent elongation and ultimate tensile strengths above 4000 pounds per square inch and ultimate elongations greater than 100 percent. These materials are usually characterized by being multiphase in that glassy or crystalline domain structures are usually detectable. Typical materials in this group are block polymers, such as styrene-butadiene-styrene triblock polymers, polyester block polymers, segmented polyurethane polymers and ionomers.

The high-modulus plastic materials are characterized by Young's moduli of 50,000 pounds per square inch or higher and yield points and/or failure points at elongations below about 15 percent. They would have a major glass or melting transition temperature above 100° C. Suitable materials in this group include compositions from polyamides, polycarbonates, epoxide resins and polystyrenes.

The elastomeric materials used in the low-modulus layers of the tire of this invention should have the major glass transition temperature below about −20° C. and can contain groupings capable of forming covalent cross-links. The molecular weight of the chains between covalent cross-links is preferably about 5,000 to 40,000 and more preferably 8,000 to 20,000.

Generally the polymeric material forming the various layers of the laminated tire of this invention should have a calculated molecular weight of at least 10,000 and a Shore A durometer hardness of at least 20 and preferably provide a tensile strength of at least 1000 pounds per square inch. The softer low-modulus layers have an elongation which is usually at least 30 percent and preferably at least 50 percent and a Shore A durometer hardness which is at least 30 and preferably no more than 90. The polymeric material of the softer low modulus layers preferably has a tensile strength of at least 2000 pounds per square inch.

There is a general relationship between Shore hardness and Young's modulus as follows:

| Shore Hardness (B.S. & I.R.H.) | Young's Modulus (psi) |
| --- | --- |
| 30 | 130 |
| 50 | 310 |
| 75 | 1340 |

It should be understood that the Shore hardness and Young's modulus values given herein must generally correlate with this relationship.

The cured low-modulus layers of the tire preferably have Young's moduli in the range of 300 to 5000 pounds per square inch and usually in the range of 500 to 3000 pounds per square inch. The preferred hardness depends on the thicknessses of the various layers, their arrangement, the stiffness of the harder layers and other factors.

The cured high-modulus layers have Young's moduli in the range of 3000 to 100,000 pounds per square inch which is usually at least twice that of the adjacent low-modulus layers and is preferably in the range of about 5000 to 50,000 pounds per square inch. The ratio of the Young's modulus of each hard layer of the laminated tire to the Young's modulus of each soft layer can be up to 300:1 but is more frequently in the range of 3:1 to 20:1 in a passenger car tire.

The preferred modulus for the harder layers depends, of course, on many factors and should be selected to provide the composite tire with the desired overall modulus and stiffness. For example, if the laminated carcass portion of the tire consists of 50 percent by weight of high-modulus polymeric material and 50 percent by weight of low-modulus material, then the Young's modulus might be 500 to 2000 psi for the soft layers and 4000 to 8000 psi for the hard layers. If, on the other hand, the amount of the high-modulus material is reduced to only 25 percent of the weight, then the Young's modulus could be increased to 10,000 to 15,000 psi or perhaps 20,000 psi.

Generally the total weight of the low-modulus layers of the laminated tire carcass should be at least equal to the total weight of the high-modulus layers as illustrated in the accompanying drawings, and it is desirable to provide low-modulus layers at the inner and outer surfaces of the laminate, particularly at the outer surfaces of the sidewall portions.

The number of layers can be limited to reduce manufacturing costs, but it is preferably to employ at least seven layers and more preferably at least nine layers. The number of layers can vary from 5 to 1000 depending on the thickness of each layer which can be from 0.001 to 0.1 inch. The number of layers is preferably in the range of 7 to 100 with thicknesses of layers in the range of 0.005 to 0.05 inch. The thickness of each layer is preferably uniform or generally uniform, and each layer is preferably circumferentially continuous and imperforate, but this is not essential. The layers may be deformed during manufacture of the tire as, for example, where the tire is shaped after the laminate is formed and before it is fully cured.

By varying the number of layers, their thicknesses, the arrangement of the layer and the hardness of the polymers used, it is possible to make an infinite number of different laminated tires in accordance with this invention. The simpler arrangements are generally preferred with each low-modulus layers of the same hardness and each high-modulus layer of the same hardness. To improve adhesion between layers, it is desirable to make all layers of generally the same type of polymer (i.e., polyurethane). However, it will be understood that adhesion problems can be solved by use of adhesives or perforations in the layers or in various other ways.

Good results can be obtained where all of the high-modulus layers are formed of the same elastoplastic material having an elongation at yield of about 5 to about 10 percent and a Young's modulus of 5,000 to 20,000 psi and all of the low-modulus layers are formed of the same elastomeric material having an elongation of at least 50 percent and a Young's modulus of 500 to 2000 psi. The tensile strength of the high-modulus layers should be at least 2000 psi and preferably at least 3000 psi.

In a special laminate of the type illustrated in FIG. 3, the layers L could have a Young's modulus of 300 to 1000 psi, the layers M could have a Young's modulus of 1000 to 3000 psi and the layers H could have a Young's modulus of 10,000 to 50,000 psi.

The laminated tires of this invention can be built in many different ways from curable sheets of rubber or plastic or from flowable polymeric materials as by centrifugal casting or extrusion. The preferred method requires a flowable curable polymeric material with a viscosity at processing temperatures which enables the material to flow under its own weight in a reasonable period. The material of the low-modulus layers should be one which cures in a reasonable period of time to provide a tensile strength, preferably of at least 1000 pounds per square inch.

The polymeric material preferred for use in the present invention is a fluid polymer, such as a polyurethane, which can be cured rapidly and which can be processed easily in automated equipment. The viscosity of the polymeric material can be adjusted by use of solvents or plasticizers, by use of heat, or by proper selection of curing agents, by changing the curing temperature, or in other ways. A large number of different polymers can be employed as are described in more detail hereinafter.

In carrying out the present invention it is preferable to form the laminations of the tire by spraying or otherwise applying curable liquid polymeric material to the inside of a tire mold. This can be done with or without a doctor blade to shape the layers.

Figure 6:
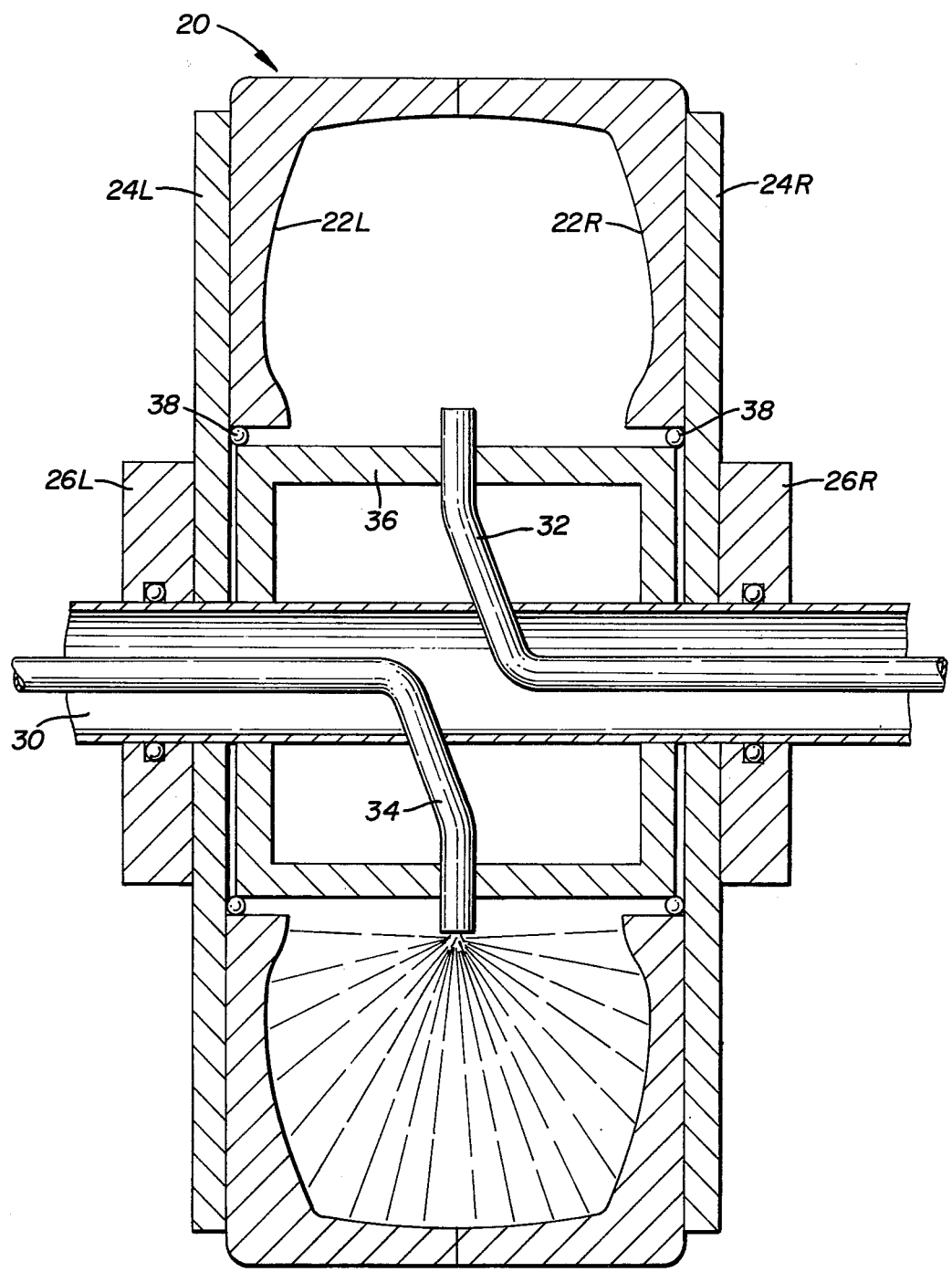
FIG. 6 is a partially schematic cross-sectional view of one embodiment of an apparatus for making laminated pneumatic tires in accordance with the process of the present invention.

FIG. 6 illustrates in partly schematic form one type of mold which may be employed to fabricate a laminated tire. The mold is illustrated for purposes of illustration rather than limitation, and it will be understood that many other types of molds may be employed. As herein shown the mold, generally designated as 20, comprises a left mold half 22L and a right mold half 22R. The mold halves are attached to flat circular restraining plates 24L and 24R which are attached respectively to bearing blocks 26L and 26R. This arrangement permits the assembly of the mold halves, plates and bearing blocks to rotate freely about hollow shaft 30 on ball bearings 28. A pair of spray tubes 32 and 34 is positioned within the shaft 30 to deliver liquid polymer to the mold. The polymer is discharged from the spray nozzles at the end of the tubes 32 and 34 to the inside surface of the mold cavity. The ends of the tubes are held firmly in place by an annular support member 36 which is mounted on the shaft 30. Ball bearings 38 are provided around periphery of the member 36 at opposite ends thereof to provide a rotatable support for the mold halves 22L and 22R so that they can rotate freely relative to the shaft. The shaft 30 and the support member 36 may be stationary or may be mounted to rotate or turn if this is desired.

As herein shown the inner surface of the mold defined by the combination of mold halves 22L and 22R may be such that the pneumatic tire, including both the tread portion and the sidewall portions, may be totally fabricated within the mold 20. It will be understood, however, that the mold may be shaped and employed to form a laminated carcass portion to which the tread portion is applied subsequent to removal of the carcass from the mold. In such case, various techniques may be employed to apply the tread portion, and it will be understood that reinforcing belts can be provided under the tread if desired.

In the mold shown in FIG. 6 the spray nozzle or nozzles may be designed to deliver a spray of the liquid polymer to the radially outer (tread) surface and also to the interior sidewall surface of the mold as is illustrated by the broken lines radiating from the end of tube 34 in FIG. 6. In other words, the spray nozzles would deliver the liquid polymer in such a manner as to provide a layer of substantially uniform thickness covering the entire inner surface of the mold.

In forming a tire according to the present invention, it is usually preferable to provide alternating layers of low-modulus and high-modulus polymeric materials. In the mold 20 shown herein two spray tubes 32 and 34 are provided for the two different polymeric materials. If three different polymeric materials were to be employed, then three spray nozzles could be provided. It is contemplated that a high-modulus polymer would be supplied through the spray tube 34 while the flow through tube 32 is shut off and that a low-modulus polymer would be provided through the spray tube 32 while the flow through tube 34 is shut off. By alternately supplying the polymers through the different tubes, alternate layers may be formeed on the tire.

Assuming that the mold 20 is rotated continuously, rather than being stopped periodically, one layer of polymeric material may be formed on the interior surface of the mold by spraying from one of the spray tubes 32 or 34 throughout one or more rotations of the mold relative to the spray nozzle. Subquently another layer may be formed in a similar manner during one or more rotations by spraying polymeric material from the other spray tube. The centrifugal force from rotation of the mold can help to shape the layers, and it will be understood that various centrifugal casting methods may be employed to assure proper coating of the mold. However, it is desirable to provide curable polymeric material which will cure fast enough so that one layer will maintain its shape while the next layer is being applied. Also fast-curing material is desirable to assure formation of layers of substantially uniform thickness which can maintain their shape during rotation of the mold.

The sequence of operations depend to some extent on the rate of curing and the rate at which the liquid polymeric material can be supplied. For example, the mold may be rotated slowly and the polymeric material may be supplied from one spray tube at such a rate that the desired circumferential layer is formed in one revolution of the mold. Also the process can be varied to require several rotations of the mold during formation of one layer. In some cases it may be necessary, after forming a circumferential layer, to continue to rotate the mold through one or more revolutions to allow substantial curing before spraying the next layer. If the rate of curing is fast enough it may be possible to begin spraying the subsequent layer within one-half of a revolution after the previous layer was applied.

As used herein the expression "partially curing" indicates that the material has stiffened or set up sufficiently to maintain reasonable dimensionable stability so that a subsequent layer may be applied. Such expression does not necessarily require a true curing of the material.

It will be understood that various fluid polymeric materials may be employed using molds of the general type illustrated in FIG. 6 and that the viscosity or flowability of the liquid polymers may be controlled by the use of heat, solvents, plasticizers or other techniques to allow the movement of the liquid material to the mold surface at the proper rate.

In carrying out the method of the present invention it will be understood that various fluid polymers may be employed including monomers, melts, prepolymers and solutions. The fluid polymeric materials must be liquid at the time of processing and have a viscosity at processing temperatures such that they will flow under their own weight in a reasonable period of time.

One of the polymers preferred for use in the practice of the present invention is polyurethane. Such polymer is usually prepared by reacting 0.95 to 1.2 equivalent weights of an organic polyisocyanate having two to three functional isocyanate groups with one equivalent of an organic compound having a molecular weight of at least 1000 and containing active hydrogen atoms which are reactive with isocyanate (—NCO) groups. In many instances are organic chain-extending agent may be employed containing hydroxyl groups, amino groups, carboxyl groups or other groups with active hydrogen atoms reactive with isocyanate groups.

The organic compounds with active hydrogen atoms which are reactive with -NCO groups may, for example, be hydroxyl-terminated polyesters, polyester amides, polyhydric polyalkylene ethers, polyhydric polythioethers, polyacetals and the like.

The organic polyisocyanates used to form the polyurethane in the process of this invention may be of various types including aliphatic, aromatic, alicyclic and heterocylic as disclosed in said U.S. Pat. No. 3,208,500 and preferably contain at least 8 carbon atoms. Excellent results are obtained using aromatic diisocyanates such as toluene diisocyanate (TDI), 4,4'-diphenyl-methane diisocyanate (MDI) or other diphenyl-alkane diisocyanate or the like. For example, the organic diisocyanate may be an 80:20 or 65:35 blend of 2,4- and 2,6-toluene diisocyanate.

The diisocyanates suitable for use in the practice of the invention preferably have 8 to 20 carbon atoms and include the various toluene diisocyanates, the various naphthalene diisocyanates, the various phenylene diisocyanates, and the various diphenyl alkane diisocyanates as described in U.S. Pat. No. 3,701,374, the entire disclosure of which is incorporated herein by reference. Suitable diisocyanates include 3,3'-dimethyl-4,4'-diphenylmethane diisocyanate, 3,3'-dimethyl-4,4'-biphenyl diisocyanate, 3,3'-dimethoxy-4,4'-biphenyl diisocyanate and the like. Mixtures of the various diisocyanates mentioned above may also be used.

Polyurethanes of the desired molecular weight suitable for use in the present invention may be made in various ways and many different types are suitable, but it is preferable to employ bifunctional reactants which will produce flexible linear polymers. For example, a polyhydric alcohol or a hydroxyl-terminated polyether or polyester may be reacted with an organic diisocyanate to form a liquid prepolymer with a molecular weight of 800 to 20,000 having essentially either all hydroxyl end groups or all isocyanate end groups, and thereafter the prepolymer can be cured by means of diamines, diols or diisocyanates, depending upon the terminal or end group in the prepolymers. The preferred polyurethanes are those formed by capping the hydroxyl groups of polyalkylene glycols with a molecular weight from 800 to 20,000 with diisocyanates to form prepolymers, and then chain-extending and curing the prepolymers by means of diamine or diol curing agents, such as MOCA or an alkylene glycol.

The hydroxyl-terminated polyesters which can be used to form the polyurethane may be reaction products of a polycarboxylic acid and a polyhydric alcohol as described in said U.S. Pat. No. 3,208,500. The alcohol may, for example, be ethylene glycol or propylene glycol.

The organic compound containing active hydrogens for reaction with the isocyanate groups may also be a polyhydric polythioether or polyester amide as defined in said U.S. Pat. No. 3,208,500 but is more preferably a polyhydric polyalkylene ether. The ether may, for example, be the condensation product of an alkylene oxide with a glycol, such as ethylene glycol, propylene glycol, butylene glycol or the like. Any suitable alkylene oxide condensate may also be used such as, for example, condensates of ethylene oxide, propylene oxide, butylene oxide, amylene oxide, styrene oxide and mixtures thereof.

In forming liquid prepolymers for use in the process of this invention, it is preferable to react the organic diisocyanate (preferably MDI or TDI) with polyalklene glycols having molecular weights in the range of 800 to 20,000, particularly poly(alkylene glycols) having alkylene groups of from 2 to 10 carbon atoms, such as poly(ethylene glycol), poly(propylene glycol), poly(trimethylene glycol), poly(tetramethylene glycol), poly(hexamethylene glycol), high molecular weight copolymers of such glycols, and mixtures of the above poly(alkylene glycols).

The preferred prepolymers have terminal isocyanate groups, and may be cured with various diamines. The diamines preferably contain an organic central radical of 2 to 20 carbon atoms linked to two amino groups such as ethylenediamine, tetramethylenediamine, hexamethylenediamine, p-phenylenediamine, methylene-bis-2-chloroaniline ("MOCA"), 4,4'-methylene-bis-aniline, 3,3'-dichloro-4,4'-diaminodiphenylmethane, benzidine, 3,3'-dimethylbenzidine, 3,3'-dimethoxybenzidine, 3,3'-dichlorobenzidine, 4,4'-diaminodiphenylmethane, and cumene diamine.

In these polyurethane rubbers, the chains of the cured polymer contain the repeating linkage $-[P-O-CO-NH-R_1-NH-CO-NH-R_2-NH-CO-NH-R_1-NH-CO-O]-$ wherein P represents the high molecular weight poly (alkylene ether) chain, $R_1$ is the organic radical of the diisocyanate, and $R_2$ is the organic central radical of the diamine. This type of polymer with the proper molecular weight can provide excellent results in the practice of the present invention when used to provide the high- and low-modulus layers of the tire laminate. The hardness and modulus of these polyurethane polymers may, for example, be increased by increasing the isocyanate and glycol or diamine content of the system.

The type of polyurethane selected for use in making tires according to this invention will depend on the type of manufacturing process employed. The polyurethane best suited for spraying may not be best for film extrusion or some other method.

Liquid polyurethane rubbers are now available commercially which can be used in the practice of the present invention. Good results can be obtained, for example, with Adiprene L-100 prepolymers (4.1 percent NCO), Adiprene L-167 prepolymers (6.3 percent NCO), and Adiprene L-315 prepolymers (9.5 percent NCO), made by E. I. du Pont de Nemours & Co. These liquid prepolymers can be cured with conventional diamines, such as MOCA, Caytur 7 or Caytur 21 (4,4'-methylene-bis-aniline) using an equivalent weight ratio of diamine to prepolymer of about 0.95 to about 1.10. Caytur 7 is a eutectic mixture of m-phenylene and cumene diamine.

Polyurethane prepolymers, such as Adiprene-L prepolymers, may, for example, be made from TDI and a polyalkylene glycol or polyol, such as poly(tetramethylene ether diol), and similar prepolymers can be made using MDI instead of TDI or using a somewhat different polyol. Various poly(alkylene glycols) and poly (alkylene ether) polyols can be used, both diols and triols, and the prepolymers can have either terminal —OH groups or terminal —NCO groups (preferably the latter).

The polymeric material used in the tire of the present invention may also be a polyamide plastic, such as nylon 66, nylon 610 or nylon 6. Various long-chain synthetic polymeric amides having recurring amide groups as an integral part of the main polymer chain can be used, such as those prepared by the condensation of diamines and dibasic acids, those obtained by the condensation of polycarboxylic acids with polyamines, or those obtained by the polycondensation of caprolactam.

Various triamines may be used, such as diethylenetriamine and the like, but it is preferable to employ diamines. Suitable diamines include ethylenediamine, diethylenediamine, pentamethylenediamine, hexamethylenediamine, phenylenediamine, and the like or mixtures thereof.

Various polybasic acids may be used to make the polyamide ranging from succinic acid to sebacic acid and including, for example, succinic acid, aconic acid, adipic acid, malic acid, itaconic acid, fumaric acid and the like.

The polyamides suitable for use in rubber tires which can be used in the practice of the present invention are described in U.S. Pat. No. 3,208,500 which is incorporated herein by reference. The preferred polyamides are those made from diamines and dibasic acids, such as the reaction products of hexamethylenediamine or similar diamine with a dibasic acid, such as adipic acid or sebacic acid.

While there are many different types of polymers which can be employed in the practice of this invention, the most promising polymers appear to be polyurethanes and polyamides or nylons as discussed generally in said U.S. Pat. No. 3,208,500. At present the most practical polymers seems to be polyurethanes, particularly polyether urethanes and polyester urethanes.

One advantages of the polyurethanes is that they can be obtained in liquid form with viscosities suitable for spraying or for spreading. Also they can be used in both the high- and low-modulus layers, thereby reducing the adhesion problem. It is also possible to blend polyurethanes of different molecular weights to get the desired properties.

For example, the laminated tire of this invention can be made using Adiprene L-42 (molecular weight about 3000) for the low-modulus layers and Adiprene L-167 (molecular weight about 1330) for the high-modulus layers. Also the high-modulus layer could be made using a blend of 60 parts by weight of Adiprene L-167 and 40 parts by weight of Adiprene L-315 (molecular weight about 900). The curing agent could be MOCA, Caytur 21 or other suitable diamine, and the plasticizer, if any, could be dioctylphthalate or the like. The curing agent could provide relative fast curing to minimize the time delay after each layer is applied before the next layer is applied.

The polyurethane prepolymers can also modified in various ways to produce the desired properties. For example, Adiprne L-167 (a prepolymer with a Brookfield viscosity of about 5000 to about 7000 centipoises at 30° C. and about 250 to about 350 centipoises at 100° C.) can be cure with 1,4-butanediol and trimethylolpropane in suitable proportions to provide a rubber layer of the desired type. A curable polyurethane composition could, for example, be made by mixing 160 parts by weight of Adiprene L-167 with about nine parts of 1,4-butanediol, about 1.6 parts of trimethylolpropane and a small amount of dioctylphthalate.

The laminated tire of this invention is preferably constructed so that the tear strength of the laminate (split sample method) is 50 to 400 or more pounds per lineal inch and so that the low-modulus layers have a tensile strength of at least 1000 pounds per square inch, a Shore A durometer hardness in the range of about 30 to 90, and an elongation of at least 50 percent (more preferably at least 100 percent).

The curable polymers used in the practice of this invention need not be liquid, but liquid polymers are preferred to facilitate manufacture. The viscosity of the liquid polymers may, for example, be 1000 to 50,000 centipoises and should be less than 100,000 centipoises at 30° C. The viscosity may be adjusted by adding substantial amounts, sometimes up to 10 or 20 parts, of a plasticizer, such as dioctylphthalate, per 100 parts by weight of the polymer.

In some cases solvents may be used with the polymers to provide the desired flowability. The choice of solvent depends on the type of polymer and the type of curing system. Various solvents which may be used include ethyl acetate, acetone, toluene, methyl ethyl ketone, xylene, beta-ethoxyethyl acetate and the like. These are preferably relatively pure and free of moisture.

While the laminates of the pneumatic tires above employ substantially different polymer formulations in the low- and high-modulus layers, it will be understood that the invention also contemplates improved laminates with improved flex crack resistance wherein similar formulations are used in all of the layers and the tensile moduli in any given direction (such as circumferential or radial, etc.) is substantially different in adjacent layers. In accordance with the invention a difference in tensile modulus can be provided between adjacent layers H and L (FIG. 2, for example) when using the same polymer in both layers as a result of a different molecular orientation in the adjacent layers.

The term "tensile modulus" as used herein refers to the stress in psi which must be exerted on a sample to stretch it to a stated elongation, such as 10, 100 or 200 percent.

In a laminated tire constructed according to the present invention (as in FIG. 2, for example) each layer preferably has a 10 percent modulus in one direction which is at least about twice the 10 percent modulus of the next adjacent layer in that direction. For example, the desired difference in tensile modulus between layers H and layers L in the various species of FIGS. 2 through 5 may be achieved by molecular orientation or by use of different polymers in different layers, or both.

One advantage of using the same or similar polymers in adjacent layers is the ease of achieving good adhesion.

As used herein the term "parts" means parts by weight and the term "polymer" includes homopolymers or copolymers unless the context shows otherwise.

The term "fluid" as applied to a polymeric material indicates that the material has viscosity such that it can flow during processing. The viscosity may, for example, be from 100 to 10,000 centipoises at 30° C. and should not exceed 100,000 centipoises at that temperature.

The following example is provided for purposes of illustrating the nature of the invention, and is not for the purpose of limiting the invention.

EXAMPLE

This example is included to illustrate the greatly improved ability of a tire made in accordance with the present invention to resist the propagation of a cut flaw or to form a crack. In order to illustrate this ability, laminated and homogeneous samples were subjected to a De Mattia flex test, with a comparison being made between each laminated sample and a homogeneous sample made from a blend of the materials in the particular laminate, and in the same proportions. Each of the samples was 1 inch wide, one-quarter of an inch wide and six inches long. They were press cured for 2 hours at 250° F. (121° C.) followed by post curing in an oven for another 2 hours at 176° F. (80° C.). Each sample then has an artificial flaw of 0.1 inch (0.254 cm.) imposed across the quarter inch wide surface, perpendicular to the 1 inch wide surface. The fatigue test was performed on a De Mattia flex machine which flexes the sample (at 333 cycles per minute and at room temperature) causing the imposed flaw to propagate laterally across the width of the sample.

For this experiment, two different material formulations were used which will be referred to as "100" and "167" as follows (parts refers to parts by weight):

| Ingredient | Parts "100" | Parts "167" |
|---|---|---|
| Adiprene L-100 (1)* | 100 | — |
| Adiprene L-167 (2)* | — | 100 |
| DC - 203 (3)* | 0.1 | 0.1 |
| Dioctylphthalate plasticizer | 1.0 | — |
| Caytur 21 (4)* | 20.3 | 31.1 |
| | 130.4 | 131.2 |

*Note:
(1) and (2) are liquid prepolymers as previously described; (3) is a liquid silicone mold release and emulsifying agent, Dow Corning; and (4) is a 50% dispersion of methylene dianiline/ sodium chloride complex in dioctyle phthalate, du Pont.

Samples were made from each of these formulations alone and the De Mattia test was used to determine the number of cycles necessary for the 0.1 inches (0.254 cm.) flaw to become 0.5 inches (1.27 cm.). The number in parentheses under each psi. reading represents $10^6$ pascals. In addition, other properties were measured as follows:

Table I

| Property | "100" | "167" |
|---|---|---|
| 10% Modulus | 160 psi. (1.1030) | 370 psi. (2.5507) |
| 100% Modulus | 405 psi. (2.7920) | 690 psi. (4.7568) |
| 200% Modulus | 510 psi. (3.5159) | 860 psi. (5.9288) |
| Tensile (rupture) | 2055 psi. (14.167) | 2290 psi. (15.787) |
| Elongation (rupture) | 750% | 575% |
| Hardness | | |
| Shore A | 83 | 91 |
| Shore D | 29 | 42 |
| De Mattia (cycles to .5 inch crack) | 500 | 1000 |

Formulations "100" and "167" were next used to make the samples containing both materials. In the case of the blends, the ratio stated in Table II is the ratio of "100" to "167" and for the laminates reported in Table II, there is one more layer of "100" than of "167", with both outer layers being the "100".

Table II

| Property | 3-layer | 2:1 | 5-layer | 3:2 | 7-layer | 4:3 | 9-layer | 5:4 |
|---|---|---|---|---|---|---|---|---|
| 10% Modulus | 225 psi. (1.55) | 285 psi. (1.965) | 185 psi. (1.275) | 295 psi. (2.034) | 205 psi. (1.413) | 225 psi. (1.551) | 200 psi. (1.379) | 250 psi. (1.724) |
| 100% Modulus | 465 psi. (3.206) | 510 psi. (3.516) | 375 psi. (2.585) | 530 psi. (3.654) | 420 psi. (2.895) | 435 psi. (2.999) | 430 psi. (2.964) | 460 psi. (3.171) |
| Tensile (rupture) | 1840 psi. (12.68) | 2420 psi. (16.68) | 990 psi. (6.825) | 1910 psi. (13.17) | 1110 psi. (7.652) | 1940 psi. (13.37) | 1600 psi. (11.03) | 2190 psi. (15.10) |
| Elongation (rupture) | 660% | 730% | 445% | 565% | 470% | 650% | 575% | 720% |
| Hardness | | | | | | | | |
| Shore A | — | 86 | — | 87 | — | 84 | — | 86 |
| Shore D | — | 33 | — | 32 | — | 32 | — | 34 |
| De Mattia (cycles to .5 inch crack) | 1500 | 1600 | 5000 | 1000 | 6000 | 1750 | 5200 | 1400 |

Referring to Table II, the second column has the heading "3-layer" designating a laminated sample comprising two outer layers of "100" and a central layer of "167." the next column "2:1" designates a homogeneous sample made from a blend of 2 parts by weight of "100" and 1 part by weight of "167." The subsequent columns designate laminated and homogenous samples with different proportions. The nine-layers laminated sample, for example, can be compared with the homogeneous sample made from the 5:4 blend as indicated in the last column.

The above data demonstrates that a marked increase in fatigue life, such as 400 to 500 percent, can be achieved in a laminated sample while still retaining physical properties adequate for conditions to be expected in a pneumatic tire. While the data for tensile strength and elongation are somewhat erratic, this behavior occurs at strains far above those that would be found in end use and does detract from the fact that a marked improvement is observed in fatigue life. The somewhat erratic behavior in tensile strength and rupture elongations in these specimens is related to flaws in the specimen that influence these properties but not the flexing behavior.

It will be understood that, in accordance with the provisions of the patent statutes, variations and modifications of the specific methods and articles disclosed herein may be made without departing from the spirit of the invention.

I claim:

1. In a pneumatic tire casing having a tread portion and flexible sidewall portions which are free of fabric reinforcement, the improvement wherein each of said sidewall portions comprises:
   a series of layers of flexible polymeric material with a calculated molecular weight of at least 10,000 and a Shore A durometer hardness of at least 20,
   a series of said layers comprising low-modulus polymeric material with a Young's modulus which is from about 100 to about 5,000 pounds per square inch,
   a plurality of said layers being interspersed with the low-modulus layers and comprising a higher-modulus polymeric material with a Young's modulus which is from about 3000 to 100,000 pounds per square inch, each of which layers has a Young's modulus at least twice that of the next adjacent low-modulus layer.

2. The improvement of claim 1 wherein each of said sidewall portions contains high-modulus layers with a Young's modulus of about 5000 to about 50,000 pounds per square inch.

3. The improvement of claim 1 wherein each of said sidewall portions contains low-modulus layers with a Young's modulus of about 500 to about 3000 pounds per square inch.

4. The improvement of claim 1 wherein each sidewall portion comprises nine to 100 layers of polymeric material with a thickness from about 0.001 to about 0.1 inch.

5. The improvement of claim 1 wherein the high-modulus layers have a Young's modulus which is three to 20 times that of the low-modulus layers.

6. The improvement of claim 1 wherein the low-modulus layers are formed of a polymeric material with an elongation of at least 30 percent and a Shore A durometer hardness from about 30 to 90.

7. The improvement of claim 1 wherein the low-modulus layers are formed of an elastomeric polymeric material with an elongation of at least 50 percent.

8. The improvement of claim 1 wherein the high-modulus layers are formed of an elastoplastic material with an elongation of about 5 to about 10 percent.

9. The improvement of claim 1 wherein the higher modulus layers are formed of nylon.

10. The improvement of claim 1 wherein the layers of the laminated tire are formed of polyester or polyether urethane.

11. A pneumatic rubber tire having a carcass including sidewall portions in the form of a flexible laminate each layer of the laminate being parallel to the outer surface of the sidewall in which the layer is incorporated, said laminate comprising at least seven layers of flexible polymeric material with a calculated molecular weight of at least 10,000, a series of said layers comprising low-modulus polymeric material with a Young's flexural modules not in excess of 3000 pounds per square inch, a series of said layers being interspersed with the low-modulus layers and comprising high-modulus polymeric material with a Young's modulus of at least 3000 pounds per square inch, the high-modulus layers having a 10 percent modulus which is at least twice that of the low-modulus layers.

12. A pneumatic rubber tire according to claim 11 wherein said laminate has a tear strength of at least 50 pounds per lineal inch and contains at least nine layers, each layer having a tensile strength of at least 3000 pounds per square inch.

13. A pneumatic tire according to claim 11 wherein each layer of said laminate is formed of a vulcanized polyurethane polymer and has a tensile strength of at least 3000 pounds per square inch, and wherein the polymer of each layer is made from a prepolymer prepared by reacting (A) one equivalent weight of a polyester or a polyether having a molecular weight of at least 2000 and terminal hydroxyl groups and having ester linkages or ether oxygen atoms between chains of carbon atoms with (B) 0.95 to 1.2 equivalent weights of an organic diisocyanate having 8 to 20 carbon atoms, said prepolymer being thereafter reacted with an organic polyamine or polyol having two to three amino or hydroxyl groups.

14. A pneumatic tire according to claim 13 wherein said prepolymer is made by reacting a poly(alkylene ether) glycol with said diisocyanate, and said prepolymer is thereafter reacted with about 0.95 to about 1.1 equivalents of a diamine curing agent per equivalent of isocyanate groups in the prepolymer.

15. A pneumatic tire according to claim 11 wherein the low-modulus layers are formed from a liquid polyester or polyether urethane prepolymer with a molecular weight from about 2000 to about 20,000 and wherein the high-modulus layers are formed from a liquid polyester or polyether urethane prepolymer with a molecular weight from about 800 to about 2000, said prepolymers being subsequently cured with a diamine or diol.

16. A pneumatic rubber ring having a carcass in the form of a flexible laminate, said laminate comprising at least seven layers of flexible polymeric material having a tensile strength of at least 2000 pounds per square inch and a calculated molecular weight of at least 10,000, said laminate having alternating layers with different tensile moduli in one direction, each layer having a Young's flexural modulus of at least 1000, a series of said layers having a tensile modulus in said one direction at 10 percent elongation which is at least twice the tensile modulus of adjacent layers in that one direction at 10 percent elongation, whereby the laminate has a high resistance to flex cracking.

* * * * *

UNITED STATES PATENT AND TRADEMARK OFFICE
CERTIFICATE OF CORRECTION

PATENT NO. : 4,044,811
DATED : August 30, 1977
INVENTOR(S) : Thomas J. Dudek, et al It is certified that error appears in the above—identified patent and that said Letters Patent are hereby corrected as shown below:

Column 16, line 43, which reads: "A pneumatic rubber ring..."
should read --- A pneumatic rubber tire ---.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks